United States Patent [19]

Shen et al.

[11] Patent Number: 5,707,538
[45] Date of Patent: Jan. 13, 1998

[54] VARIABLE GAP MAGNETORESISTIVE TRANSDUCER AND METHOD OF MAKING THE SAME

[75] Inventors: Yong Shen, Milpitas; T. C. Chuang, Saratoga, both of Calif.

[73] Assignee: Read-Rite Corporation, Milpitas, Calif.

[21] Appl. No.: 508,477

[22] Filed: Jul. 28, 1995

[51] Int. Cl.$^6$ .............................. G11B 5/127; B05D 1/00
[52] U.S. Cl. .................. 216/22; 156/654.1; 156/655.1; 156/659.11; 216/41; 216/83; 216/95; 216/109; 360/113
[58] Field of Search ............................. 156/659.11, 643.1, 156/646.1, 654.1, 655.1; 216/22, 41, 49, 51, 83, 95, 108, 109

[56] References Cited

U.S. PATENT DOCUMENTS

| | | | |
|---|---|---|---|
| 4,849,070 | 7/1989 | Bly et al. | 216/41 |
| 5,209,817 | 5/1993 | Ahmad et al. | 216/41 |
| 5,554,265 | 9/1996 | Bonyhard et al. | 216/22 |

*Primary Examiner*—T. Tung
*Attorney, Agent, or Firm*—Nathan N. Kallman

[57] ABSTRACT

A magnetoresitive transducer has an insulating gap layer of variable thickness. The transducer includes a magnetoresistive layer disposed in an active region, and a first magnetic shield layer disposed in the active region and a field region. An insulating layer is spaced between the magnetoresistive layer and the magnetic shield layer. The insulating layer is thinner in the active region than in the field region. The probability of other layers bridging through the insulating layer in the field region is substantially reduced. The method of forming the transducer includes depositing a first insulating layer above the magnetic layer, and then selectively etching the first insulating layer by forming an opening in the active region having a cross-sectional profile sloping inwardly toward the magnetic shield layer. Thereafter, an insulating layer is deposited atop the first insulating layer having the opening. The combined insulating layers constitute the gap layer of variable thickness in the magnetoresistive transducer.

10 Claims, 3 Drawing Sheets

5,707,538

1

VARIABLE GAP MAGNETORESISTIVE TRANSDUCER AND METHOD OF MAKING THE SAME

FIELD OF THE INVENTION

This invention relates to magnetic transducers and in particular to structures and fabrication methods of thin film magnetoresistive (MR) transducers.

BACKGROUND OF THE INVENTION

Magnetic recording media in the form of tapes or disks have been widely used for storage of data. Magnetic transducers are commonly employed to perform the tasks of interacting with these recording media. In the prior art, an inductive coil was implemented as a key component in a magnetic transducer. The recent use of an MR element in a magnetic head provides many advantages not realized in the past. Modern day thin film technology allows an MR transducer to be fabricated at miniaturized scale. As a result, the MR transducer can read information on a recording medium with much narrower track widths and can yield better signal-to-noise output. Also, the output signal generated during the read process is independent of the traveling speed of the recording medium. Consequently, a higher linear recording density per track on the recording medium is made possible.

A typical MR transducer includes an MR layer sandwiched between two magnetic layers. Disposed between the MR layer and the magnetic layers are insulating layers. During the data reading mode, magnetic flux emanating from a recording medium is sensed by the MR layer. The magnetic layers act as magnetic flux guides confining the intercepted magnetic flux to the MR layer. The changes in magnetic flux correspondingly vary the resistivity of the magnetoresistive layer. A direct electric current passing through the MR layer generates a varying voltage which represents the information stored by the recording medium.

The constant demand for electronic products with compact sizes prompts manufacturers to provide storage media with decreased track widths and increased linear recording densities. As a consequence, magnetic transducers are scaled down in proportion with smaller lateral dimensions and thinner interposing layers. For example, in a magnetoresistive transducer, the read gap is spaced much closer. A thinner gap offers the benefit of allowing the magnetic transducer to read data tracks with dense linear recording density. However, the thinner insulating layer forming the gap is more prone to bridge the layers intended to be insulated. Transducers thus built are likely to be low in production yield and consequently at a higher fabrication cost.

SUMMARY OF THE INVENTION

It is an object of the invention to provide a transducer, and method of making the same, which is capable of reading recorded media with high linear recording density.

Another object is to realize a high production yield with a resultant lower production cost.

In accordance with this invention, a magnetic transducer includes an MR layer disposed in an active region, and a first magnetic shield layer disposed in the active region and a field region. An insulating layer is spaced between the MR layer and the magnetic shield layer. The thickness of the insulating layer is less in the active region than in the field region. Thus, the probability of other layers bridging through the insulating layer in the field region is substantially reduced.

2

The method of forming the transducer of the invention includes depositing a first insulating layer above the magnetic shield layer, and then selectively etching the first insulating layer by forming an opening in the active region having a cross-sectional profile sloping inwardly toward the magnetic shield layer. Thereafter, another insulating layer is deposited atop the first insulating layer having the opening. The overlapping deposited layers constitute the insulating layer having a lesser thickness in the active region than in the field region.

The thin insulating layer in the active region defines a thinner read gap and allows the transducer to interact with recording media at high linear recording densities. The thicker portion of the insulating layer in the field region allows the fabrication of the transducer without substantial sacrifice in production yield, thereby lowering production cost.

BRIEF DESCRIPTION OF THE DRAWINGS

The invention will be described in greater detail with reference to the drawings in which.

DETAILED DESCRIPTION OF THE INVENTION

Figure 1:
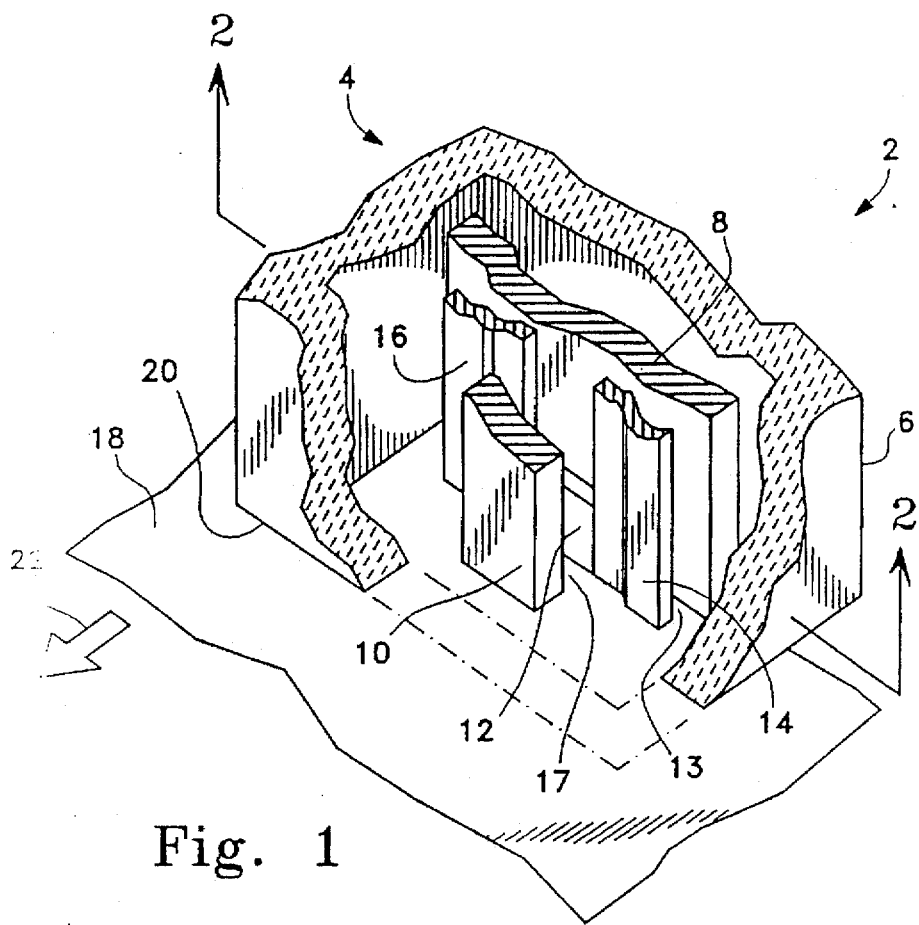
FIG. 1 is fragmentary view, shown in perspective, of the transducer of the present invention.

With reference to FIG. 1, an MR transducer 2, that is part of a magnetic head 4 having a protective shell 6 is depicted. The protective shell 6 is preferably made of a non-magnetic and non-conductive material, such as ceramic. Inside the protective shell 6 are two magnetic shield layers 8 and 10 encompassing an MR layer 12. The magnetic shield layer 8 and the MR layer 12 define a first read gap 13 therebetween. In a similar manner, the magnetic shield layer 10 and the MR layer 12 define a second read gap 17 between the two layers. Sensed signal is conveyed to a sense amplifier (not shown) via a pair of electrical leads 14 and 16 connected to the magnetoresistive layer 12.

During the data reading mode, a recording medium 18 travels under the air bearing surface 20 of the magnetic head 4 in a direction of the arrow 22, for example. The aerodynamics of the moving air underneath the air bearing surface 20 provides sufficient buoyancy to suspend the magnetic head 4 to fly above the medium surface. Information stored on the recording medium 18 is sensed by the transducer 2 as changes of magnetic flux through the read gaps 17 and 13. These magnetic flux changes are converted by the transducer 2 into electrical signals at electrical leads 14 and 16. Not shown in FIG. 1 is the insulating dielectric between shield layers 8 and 10, and a dielectric substrate. However, the insulating layers and the substrate are shown in FIG. 2.

Figure 2:
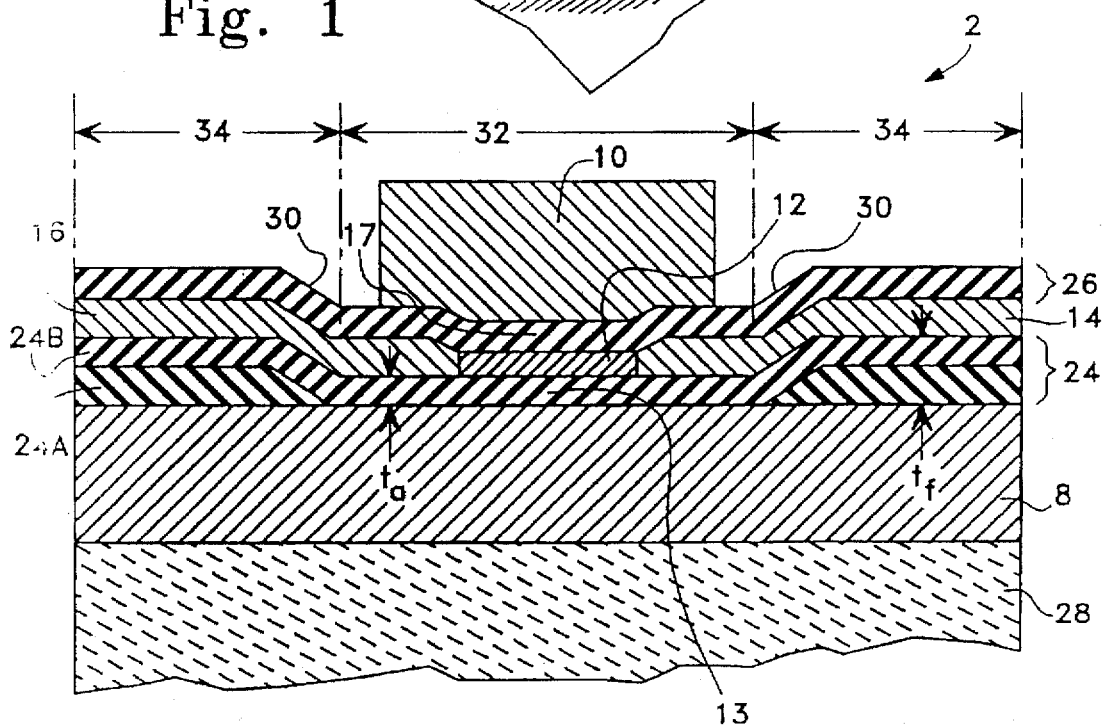
FIG. 2 is a cross-sectional view taken along line 2—2 of FIG. 1.

FIG. 2, which is a cross-sectional side view taken along line 2—2 of FIG. 1. shows the MR layer 12 disposed between the first and second magnetic shield layers 8 and 10 spaced by first and second insulating layers 24 and 26, respectively. In this embodiment, the insulating layers are formed of Alumina ($Al_2O_3$). It should be noted that the magnetoresistive layer 12 may include various magnetic bias layers for the purpose of positioning the magnetoresistive layer 12 within the optimal operating regions. The bias layers are not shown in the illustration as they are not necessary for the disclosure of the invention. The electrical leads 14 and 16 are electrically tied to the end regions of the magnetoresistive layer 12 for conveying sensed signals to the preamplifier (not shown). Underneath the first magnetic shield layer 8 is a substrate layer 28 which is insulating as well as nonmagnetic and is formed of ceramic.

Attention is now directed to the first insulating layer 24. In this embodiment, the insulating layer 24 includes a cross-sectional profile having tapered edges 30 sloping inwardly toward the magnetic shield layer 8. As arranged, the tapered edges 30 somewhat function as boundary lines which partition the transducer 2 into an active region 32 and a field region 34. During the data reading mode, the majority of the flux is guided within the active region 32 where the data reading activity is mainly concentrated. The field region 34 is provided chiefly for mechanical support of the transducer 2 and for electrical insulation of the extended leads 14 and 16.

As mentioned before, the trend in the manufacture of storage devices is toward miniaturization and high performance with fast data access rate. One way to meet these objectives is to increase the linear recording density on the storage media. Accordingly, transducer gaps of magnetic heads also need to be decreased in dimension. For example, in the embodiment shown in FIGS. 1 and 2, to interact recording media with high linear recording density, the first and second read gaps 13 and 17 need to be proportionally decreased in separation. That is, insulating layers 24 and 26 must be deposited at thinner thicknesses. However, thinner insulating layers 24 and 26 are more susceptible to film defects and substantially increase the probability of bridging the layers intended to be insulated.

On a microscopic scale, the insulating layers 24 and 26 are essentially layers formed of $Al_2O_3$ granules closely packed together with boundary gaps therebetween. Depending on the granule-to-granule spacings within the layer, the thinner the layers 24 and 26 are, the more eminent are the effects of the boundary spacings. Very often, the layers intended to be insulated are electrically shorted through these layer spacings and render the transducer 2 inoperable. It should be emphasized that the probability of encountering an insulating layer failure does not decrease linearly with the reduction in the insulating layer thickness. Instead, the relationship is exponential. Therefore, fabricating the transducer 2 with thinner insulating layers, such as layers 24 and 26, significantly affects the fabrication yield in the production process.

The insulating layer 24 of the transducer 2 shown in FIG. 2 assumes different thicknesses across the transducer profile. Specifically, the insulating layer 24 includes a larger thickness $t_f$ in the field region 34 and a smaller thickness $t_a$ in the active region. The insulating layer 24 having a smaller thickness $t_a$ in the active region 32 enables the transducer 2 to interact with recording media having higher linear recording density. Yet, the same insulating layer 24 having a thicker thickness $t_f$ in the field region reduces the probability of layer bridging, providing the consequential benefit of maintaining a high production yield, and lower manufacturing cost.

Shown in FIGS. 3A–3G are sequential drawings illustrating the preferred method of fabricating the transducer 2 of the invention. FIGS. 3A–3G are shown in schematic format.

It should be understood that during fabrication a plurality of transducers is formed simultaneously on a common substrate 28 (FIG. 2). Close to the end of the fabrication process, the substrate 28 is scribed and cut into individual transducers. Moreover, the substrate layer 28 is not shown in FIGS. 3A–3G for the sake of clarity.

Figure 3A:
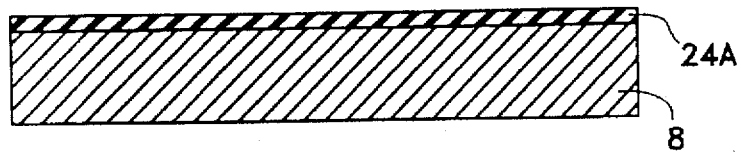
FIGS. 3A–3G are sequential views illustrating the preferred method of forming the transducer of the present invention.
Figure 3B:
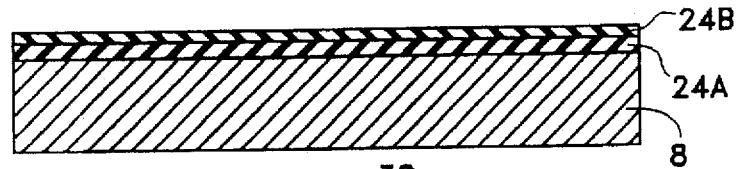

With reference to FIG. 3A, after the formation of the magnetic shield layer 8 above the substrate 28 (shown in FIG. 2) through a conventional deposition process, such as plating or sputtering, a primary insulating sub-layer 24A is then formed atop the magnetic shield layer 8. The deposition of the primary sublayer 24A can be accomplished via commonly practiced processes, such as sputtering or ion beam deposition (IBD). Thereafter, a secondary insulting sublayer 24B is deposited on the top of the sub-layer 24A in a similar manner. However, the composite contents of the sublayers 24A and 24B are comparatively different. In this method, the composite ingredient for the sublayers 24A and 24B is mainly Alumina ($Al_2O_3$). As is well known in the art, Aluminum (Al) reacts with Oxygen (O) and yields various forms of oxides, depending on the content of oxygen in proportion to aluminum during the oxidation process. For example, in a reaction environment with insufficient oxygen, aluminum oxides with oxygen deficiency would most likely result. On the other hand, under a condition with abundance of oxygen, aluminum oxides with higher oxygen content would be the eventual product. Aluminum oxides with lower oxygen composition are more prone to be attacked by etchants, such as hydrofluoric acid (HF). In this method, the different composite contents of the sublayers 24A and 24B are achieved through the proper selection of deposition targets. For example, if the process of sputtering is used, the sputtering target with the desired composite content is mounted inside the sputtering chamber. During sputtering, the plasma dislodges material from the target and the dislodged material is deposited onto the substrate with the desired composite content. The same holds true for the process of IBD. Specifically, in this method, deposition of the sublayer 24A is accomplished through the process of IBD, using a deposition target made of $Al_2O_3$, or aluminum with rich oxygen in assist source. For the deposition of sublayer 24B, relatively depleted of oxygen in assist source is selected, resulting in oxygen depleted aluminum oxide film. The resultant structure up to this step is shown in FIG. 3B.

Figure 3C:
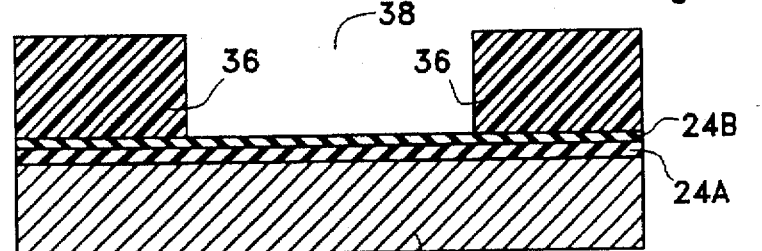

Thereafter, the structure is retrieved from the deposition chamber and a masking layer 36 is spun atop the secondary sub-layer 24B. In this method, the masking layer used is a photoresist manufactured by Hoechst Celanese Corporation of Somerville, N.J. The resultant structure is then baked at a temperature between 100° and 200° C. approximately. After cooling down, the photoresist layer 36 is patterned with an opening 38 by placing a chrome mask (not shown) with the image of the opening 38 atop the photoresist layer 36, which is illuminated with ultraviolet light. The resultant structure is submerged in a fluid bath filled with a photoresisit developer, such as AZ400K, manufactured also by Hoechst Celanese Corporation. The exposed portion of the photoresist layer 36 is then rinsed away by N-Methyz-Pyrollidone (NMP), and the resultant structure up to this step is shown in FIG. 3C.

Figure 3D:
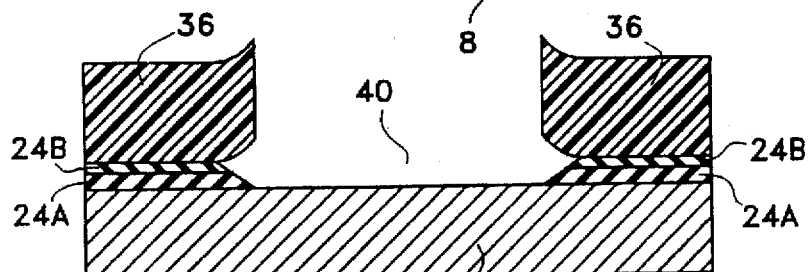

What follows is the step of insulating layer etching. The etchant used in this method is diluted HF. The etching process involves submerging the resultant structure with the patterned photoresist in a liquid bath filled with diluted HF. As mentioned before, alumina with lower oxygen content is more prone to be attacked by etchant such as HF. The diluted HF etches material in sublayer 24B faster than that of the sublayer 24A. The net result is an opening 40 formed in the sublayers 24A and 24B having a cross-sectional profile with tapered edges 30 sloping inwardly toward the magnetic shield layer 8 as shown in FIG. 3D.

Figure 3E:
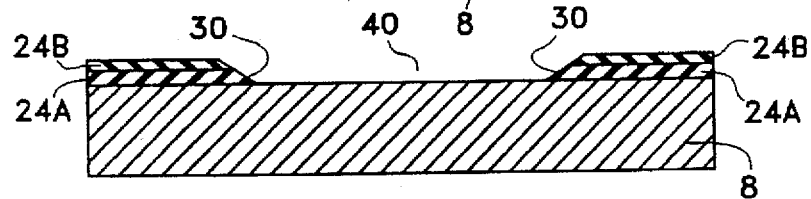
Figure 3F:
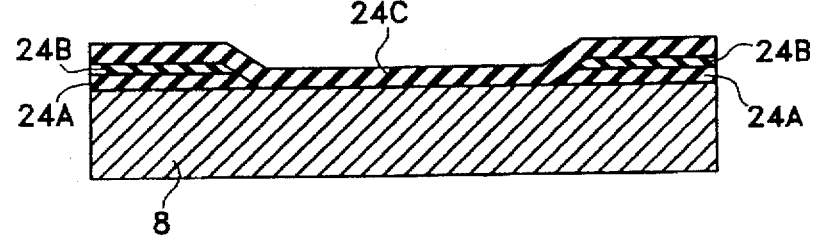
Figure 3G:
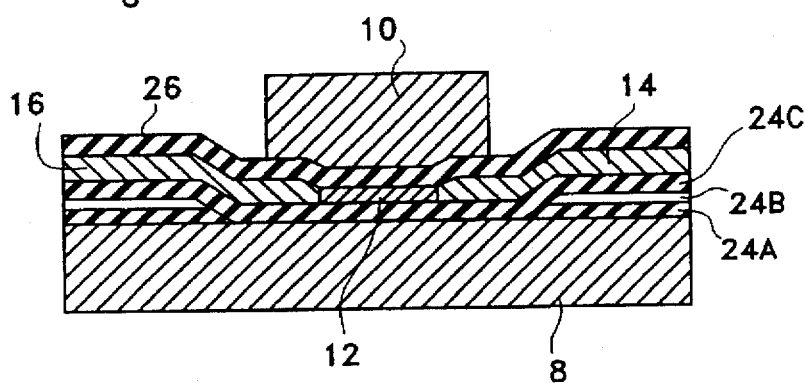

The photoresist 36 is then washed away in an aqueous solution of hot NMP. The resultant structure up to this step is shown in FIG. 3E. The surfaces of the sub-layers 24A and 24B and the magnetic shield layer 8 is then cleaned by a solution of propanol and deionized water, and the resultant structure is ready for another deposition step. Another layer of insulating layer 24C is then deposited onto the structure in the same manner as depositing sub-layers 24A and 24B.

What follows are steps of forming magnetoresistive layer 12 and electrical leads 14 and 16, and the third insulating layer 26 thereabove through the conventional methods of deposition and etching. Similarly, the steps of forming a second magnetic shield layer is well known in the art and is therefore not elaborated here.

Figure 4A:
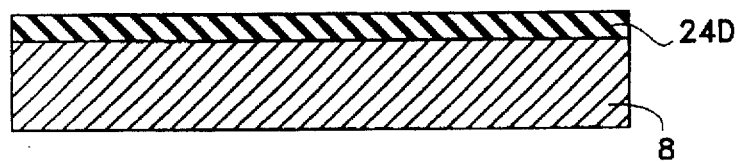
FIGS. 4A–4E are cross-sectional views illustrating an alternative method of forming the transducer of the present invention.
Figure 4B:
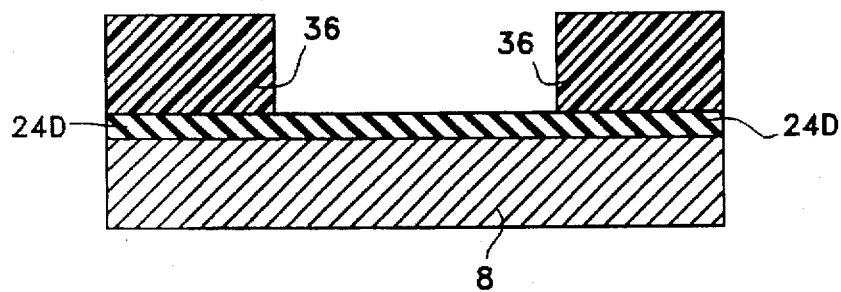

Shown in FIGS. 4A–4E are sequential drawings of a second method of fabricating the transducer of the present invention. As with the first method mentioned before, after the formation of the magnetic shield layer 8 over the substrate 28 (FIG. 2), an insulating layer 24D is deposited onto the magnetic shield layer 8. However, in this method, only one sub-layer 24D is deposited. Again, the deposition of the sub-layer 24D can be achieved either through the process of sputtering or IBD. Afterwards, the resultant structure is dismounted from the deposition chamber. A photoresist layer 36 is patterned with an opening 38 in the same manner as described in the preferred method mentioned previously. The exposed portion of the photoresist layer 36 is then rinsed away by hot NMP, and the resultant structure up to this step is shown in FIG. 4B.

Figure 4C:
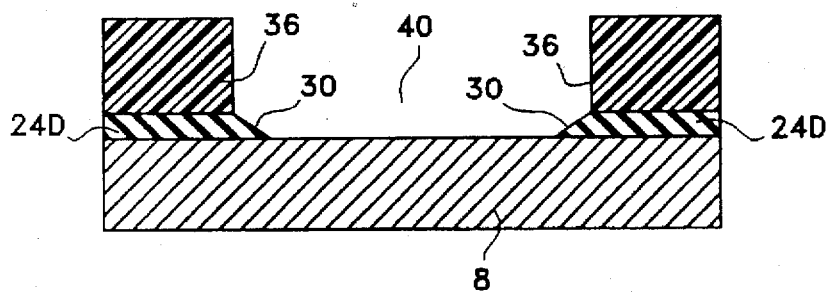

Then the step of combination etching of the insulating layer 24D and the developed photoresist layer 36 takes place. The etchant used in this method is the AZ400K developer. The etching process involves submerging the resultant structure in a liquid bath filled with the developer. This time, the AZ400K developer etches the photoresist layer 36 comparatively faster than the underlying insulating sublayer 24D. As a consequence, an opening 40 is formed in the sublayers 24D having a cross-sectional profile with tapered edges 30 sloping inwardly toward the magnetic shield layer 8, as shown in FIG. 4C.

Figure 4D:
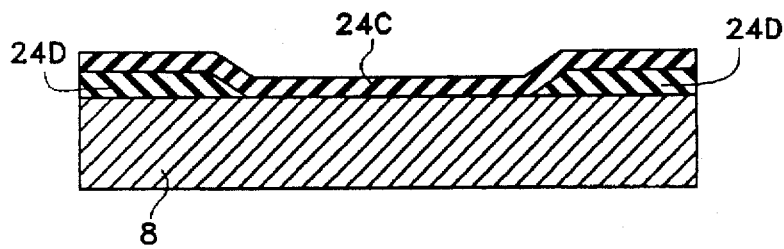
Figure 4E:
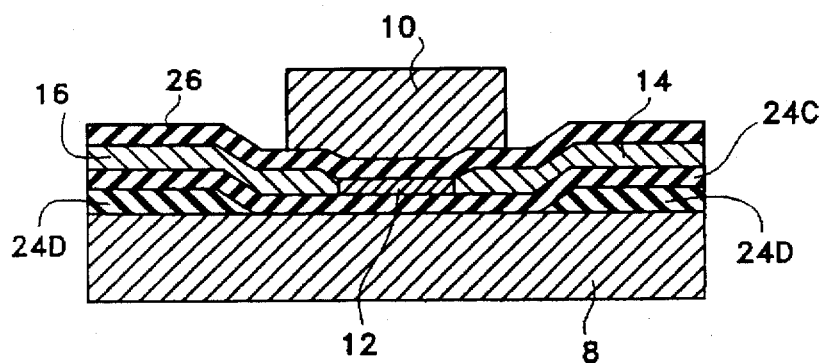

The photoresist is then rinsed away by a hot solution of NMP. The resultant structure is shown in FIG. 4D. The surfaces of the sub-layers 24D and the magnetic shield layer 8 is then cleaned by a mixed solution of propanol and acetone, and the resultant structure is ready for another deposition step. Another layer of insulating layer 24C is then deposited onto the resultant structure in the same way as described in the first method.

Finally, other variations are possible within the scope of the invention. For example, edges 30 in opening 40 need not be formed as sloping inwardly toward the magnetic layer 8. Edges 30 can be abrupt-stepped edges if step coverage of the overlying layers is not a main concern. There can also be more than two sub-layers 24A and 24B in the process of fabrication. Moreover, the materials used need not be restricted as described. For example, the insulating layers can be formed of Silicon Dioxide ($SiO_2$) or Silicon Nitride ($Si_2N_3$). The photoresist can be formed of another type resist, such as AZ4110 or AZ4330. These and other changes in form and detail may be made therein without departing from the scope and spirit of the invention as defined by the appended claims.

What is claimed is:

1. A method of forming a magnetic transducer having an insulating gap layer spaced between a magnetic shield layer and a magnetoresistive layer, said method comprising the steps of:

forming a first insulating layer above the magnetic shield layer;

forming an opening in said first insulating layer by etching away a predetermined portion of said first insulating layer; and forming a second insulating layer over said opening and completely above said first insulating layer, wherein said first and second insulating layers constitute the insulating gap layer spaced between the magnetic shield layer and the magnetoresistive layer;

wherein said step of forming an opening comprises selectively etching more material in said first insulating layer farther from the magnetic shield layer than adjacent to the magnetic shield layer such that said opening includes a cross-sectional profile sloping inwardly toward said magnetic shield layer.

2. The method of forming a magnetoresistive transducer as set forth in claim 1 wherein said step of forming a first insulating layer comprises forming a primary insulating sublayer of aluminum oxide enriched with oxygen above the magnetic shield layer; and forming a secondary insulating sublayer of oxygen depleted aluminum oxide above said primary insulating sublayer, said secondary insulating sublayer having a composite content different from said primary insulating sublayer, wherein said primary and secondary sublayers constitute said first insulating layer.

3. The method of forming a magnetoresistive layer as set forth in claim 2 wherein said step of forming an opening comprises forming a masking layer above said secondary insulating sublayer;

forming an opening through said masking layer;

etching said primary and secondary insulating sublayers using an etchant which etches said secondary insulating sublayer comparatively faster than said primary insulating sublayer; and removing said masking layer.

4. The method of forming a magnetoresistive transducer as set forth in claim 1 wherein said step of forming an opening comprises forming a masking layer above said first insulating layer;

etching said masking layer and said first insulating layer using an etchant which etches said masking layer comparatively faster than said first insulating layer; and removing said masking layer.

5. A method of forming a magnetic transducer having an insulating gap layer spaced between a magnetic shield layer and a magnetoresistive layer, comprising the steps of:

forming a first insulating layer above the magnetic shield layer;

forming an opening having a cross-sectional profile sloping inwardly toward said magnetic shield layer in said first insulating layer by selectively etching more material farther from the magnetic shield layer than adjacent to the magnetic shield layer; and forming a second insulating layer over said opening and above said first insulating layer, wherein said first and second insulating layers constitute the insulating gap layer spaced between the magnetic shield layer and the magnetoresistive layer.

6. The method of forming a magnetoresistive transducer as set forth in claim 5 wherein said step of forming a first insulating layer comprises forming a plurality of insulating sublayers above the magnetic shield layer, wherein said plurality of sublayers constitute said first insulating layer, each of said insulating sublayers having a composite content different from each other.

7. The method of forming a magnetoresistive transducer as set forth in claim 6 wherein said step of forming an opening comprises forming a masking layer above said plurality of insulating sublayers;

forming an opening through said masking layer; and etching said plurality of insulating sublayers using an enchant which substantially etches more material of said sublayers farther from the magnetic shield layer than adjacent to the magnetic shield layer.

8. The method of forming a magnetoresistive transducer as set forth in claim 5 wherein said step of forming an opening comprises forming a masking layer above said first insulating layer;

etching said masking layer and said first insulating layer using an etchant which etches said masking layer comparatively faster than said first insulating layer; and removing said masking layer.

9. A method of forming a magnetic transducer having a first magnetic shield layer and a magnetoresistive layer comprising the steps of:

forming a primary insulating layer above the first magnetic shield layer;

forming a secondary insulating layer completely above said primary insulating layer;

forming a photoresist layer over said secondary insulating layer;

forming an opening through said photoresist layer;

etching said primary and secondary insulating layers using an etchant which etches said secondary insulating layer faster than said primary insulating layer;

removing said photoresist layer;

forming a third insulating layer above said opening and said secondary insulating layer; and forming a second shield layer over said third insulating layer, wherein said primary, secondary and third insulating layers constitute insulating gap layers disposed between the magnetoresistive layer and the magnetic shield layers.

10. A method of forming a magnetic transducer having a magnetic shield layer and a magnetoresistive layer comprising the steps of:

forming a first insulating layer of rich oxygen aluminum oxide above the magnetic shield layer;

forming a photoresist layer over said first insulating layer;

forming an opening through said photoresist layer;

etching said photoresist layer and said first insulating layer simultaneously using an etchant which etches said photoresist layer comparatively faster than said first insulating layer;

removing said photoresist layer; and forming a second insulating layer over said opening and above said first insulating layer, wherein said first and second insulating layers constitute an insulating gap layer disposed between the magnetoresistive layer and the magnetic shield layer.

* * * * *